Feb. 15, 1938.  M. H. HARRIS  2,108,667
SPECTACLE FRAME
Filed Jan. 15, 1936
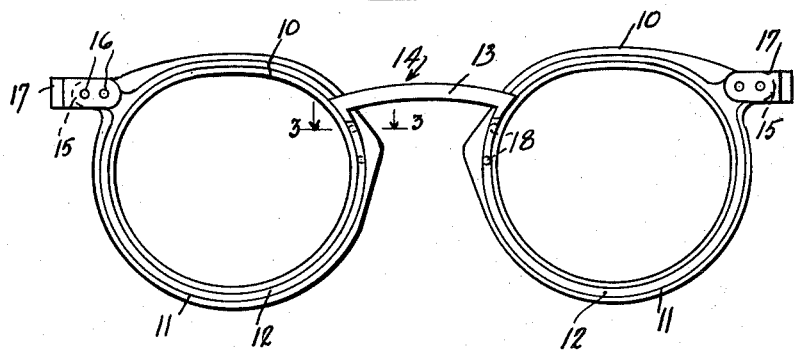
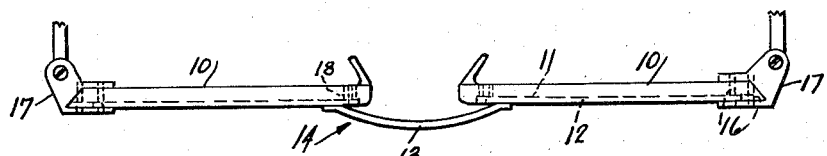
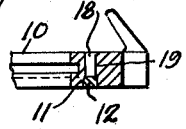   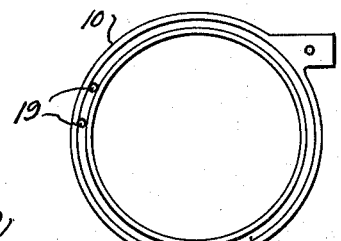
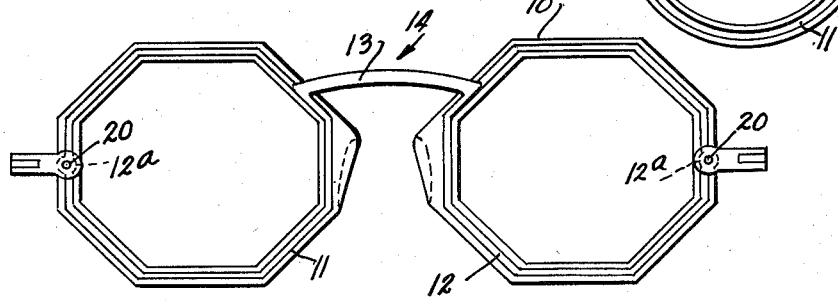
INVENTOR.
Moses H. Harris
BY
ATTORNEY.

Patented Feb. 15, 1938

2,108,667

UNITED STATES PATENT OFFICE 2,108,667

SPECTACLE FRAME

Moses H. Harris, New York, N. Y.

Application January 15, 1936, Serial No. 59,208

1 Claim. (Cl. 88—41)

This invention relates to spectacle frames and has for one of its objects to provide such a frame having non-metallic rims, the said rims being supported upon a unitary metal frame comprising a central bridge or nose piece and a pair of rings, loops or bands, the said bands being forced into the rims and flush with their front surfaces.

Another object of the invention is to provide a unitary metal frame comprising a pair of loops connected by a central bridge adapted to be forced into non-metallic spectacle rims which will reinforce the said rims and also enhance their appearance.

A further object of the invention is to provide means on the said frame and rims for properly locating the ear bows with respect to the bridge.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a rectrictive standpoint.

The inventive idea involved is capable of receiving a variety of mechanical expressions, one of which, for the purpose of illustration, is shown in the accompanying drawing, in which Figure 1 is a front view at a somewhat enlarged scale of a pair of spectacles embodying my invention;

Fig. 2 is a top plan view theraof;

Fig. 3 is an enlarged fragmental sectional view taken on line 3—3 Fig. 1;

Fig. 4 is a front view of a pair of spectacles made in accordance with my invention, the said spectacles being provided with substantially octagonal rims, and Fig. 5 is a front view of a circular spectacle rim adapted to receive my improved metal frame.

Referring now to the drawing in detail, 10 indicates the spectacle rims which may be of any desirable shape, some of the prevailing shapes being shown in Figs. 1, 4, and 5, and they may be made of celluloid or any other non-metallic material commonly used for this purpose. The front of the said rims is provided with grooves or depressions 11, the depth and width of the said grooves depending upon the thickness and width of the rims 10. Each of the grooves is adapted to receive a band or loop 12, the said bands being connected by a nose piece or bridge 13. The bridge and bands form a decorative and reinforcing unitary frame 14 which, if desirable, may be provided with extensions 15, through which the securing pins 16 of the bow hinges 17 pass.

The loops 12 are forced into the grooves 11 so that the outer surfaces of the rims and loops are flush, the bridge 13 being bent outwardly to clear the rims as shown in Fig. 2. If desirable, the loops 12 may have pins 18 soldered or otherwise secured to their rear surfaces, the said pins passing through holes 19 provided for that purpose in the rims 11. The said pins not only tend to secure the metal loops 12 in the rims 11, but they also locate the bridge 13 in proper relation to the bows, especially so when circular rims are used as in Fig. 5 where the said rims are apt to have rotary movement with respect to the metal loops 12.

In Fig. 4, the loops 12 are octagonal in shape to correspond to the shape of the rims 10 and may each be provided with flattened portions 12ª for the reception of the bow hinge securing pins 20.

It will be understood that the frame 14 may be made of precious or semi-precious metal and form a contrast with the rims 10 thus enhancing the appearance of the spectacle frame, at the same time reinforcing the said rims and providing solid metallic bearings for the various securing pins or rivets.

From the foregoing, it will be seen that I have provided a unique and novel frame structure for spectacles which will greatly improve the appearance of the spectacles and will reinforce the rim portions thereof.

Having described my invention, what I claim as new and desire to secure by Letters Patent is:

A spectacle frame comprising a pair of non-metallic rims, each rim having its front face formed with a groove extending circumferentially about the rim in spaced relation to inner and outer marginal edges thereof and a recess in its outer end portion leading from the groove, a continuous metal reinforcing ring seated in the groove of each rim and having their inner end portions provided with rearwardly extending pins passing through the rim from the bottom of the groove, a tongue extending from the outer end of each ring and countersunk in the recess of the rim, a bridge extending between said rims and having its ends joined to the rings in close proximity to said pins, and hinge members for bows having forks straddling the outer end portions of the rims and secured by pins passing through the rims and the tongues of the rings.

MOSES H. HARRIS.